(12) United States Patent
Sharma et al.

(10) Patent No.: US 10,567,310 B2
(45) Date of Patent: Feb. 18, 2020

(54) REAL-TIME DATA COMMUNICATION OVER INTERNET OF THINGS NETWORK

(71) Applicant: Tata Consultancy Services Limited, Mumbai (IN)

(72) Inventors: Hrishikesh Sharma, Bengaluru (IN); Aditya Sood, Bengaluru (IN); Purushothaman Balamuralidhar, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 419 days.

(21) Appl. No.: 14/475,756

(22) Filed: Sep. 3, 2014

(65) Prior Publication Data
US 2015/0063368 A1 Mar. 5, 2015

(30) Foreign Application Priority Data
Sep. 5, 2013 (IN) .......................... 2890/MUM/2013

(51) Int. Cl.
*H04L 12/56* (2006.01)
*H04L 12/861* (2013.01)
*G06F 11/10* (2006.01)

(52) U.S. Cl.
CPC .......... *H04L 49/9084* (2013.01); *G06F 11/10* (2013.01)

(58) Field of Classification Search
CPC . H04L 47/6215; H04L 47/6275; H04L 49/90; H04L 49/9057; H04L 47/62
USPC ........................................................ 370/412
See application file for complete search history.

(56) References Cited

U.S. PATENT DOCUMENTS

| | | | | |
|---|---|---|---|---|
| 5,428,745 A | * | 6/1995 | de Bruijn ....... | G01R 31/318385 713/155 |
| 7,924,761 B1 | * | 4/2011 | Stevens ............ | H03M 13/3761 370/315 |
| 2004/0015765 A1 | * | 1/2004 | Cooper ................ | H03M 13/35 714/750 |
| 2004/0160943 A1 | * | 8/2004 | Cain .................... | H04L 1/0041 370/351 |

(Continued)

OTHER PUBLICATIONS

Botta, Miroslav, "Forward Error Correction in IEEE 802.15.4a Standard", IEEE, 2013, (2013), 5 pgs.

(Continued)

*Primary Examiner* — Atique Ahmed

(57) ABSTRACT

System(s) and method(s) for real-time data communication over an Internet of Things (IoT) network are described. According to the present subject matter, the system(s) implement the described method(s) for real-time data communication over the IoT network. The method includes encoding, at a source communication device, data to be exchanged between peer sub-layers of IoT entities based on a Forward Error Correction (FEC) context to generate encoded data packets, the IoT entities comprising the source communication device and a destination communication device. The method further includes identifying time delay to be maintained for transmission of the encoded data packets from the source communication device to the destination communication device to have minimal data packet drop due to queue overflow at the source communication device. The method further includes transmitting the encoded data packets over the IoT network.

14 Claims, 5 Drawing Sheets

(56) References Cited

U.S. PATENT DOCUMENTS

| | | | |
|---|---|---|---|
| 2004/0179517 A1* | 9/2004 | Yamamoto | H04L 1/0039 370/356 |
| 2007/0086335 A1* | 4/2007 | McCanne | H04L 1/0002 370/229 |
| 2007/0211717 A1* | 9/2007 | Capps | H04L 69/08 370/389 |
| 2008/0025204 A1 | 1/2008 | Radha et al. | |
| 2008/0068217 A1* | 3/2008 | Van Wyk | G01D 4/004 340/870.11 |
| 2008/0155148 A1* | 6/2008 | Oyman | H04B 7/15592 710/106 |
| 2008/0184087 A1* | 7/2008 | Hayashi | H04L 1/1825 714/751 |
| 2009/0013356 A1* | 1/2009 | Doerr | H03M 13/29 725/62 |
| 2009/0300469 A1* | 12/2009 | Rajakarunanayake | H03M 13/3761 714/776 |
| 2010/0020686 A1* | 1/2010 | Lee | H04L 41/5003 370/231 |
| 2011/0072321 A1* | 3/2011 | Dhuse | G06F 11/1076 714/55 |
| 2011/0096828 A1* | 4/2011 | Chen | H04N 21/23106 375/240.02 |
| 2012/0030367 A1* | 2/2012 | Lei | H04N 21/2402 709/231 |
| 2012/0209933 A1* | 8/2012 | Ridges | H04L 65/403 709/208 |
| 2014/0241164 A1* | 8/2014 | Cociglio | H04L 47/2475 370/235 |

OTHER PUBLICATIONS

Ersue, M., et al., "Management of Networks with Constrained Devices: Problem Statement, Use Cases and Requirements", draft-ersue-constrained-mgmt-03, Internet-Draft, Feb. 14, 2013, Copyright 2013 IETF Trust and authors, (Feb. 14, 2013), 77 pgs.

* cited by examiner

REAL-TIME DATA COMMUNICATION OVER INTERNET OF THINGS NETWORK

CLAIM OF PRIORITY

This application claims the benefit of priority of India Patent Application Serial No. 2890/MUM/2013, entitled "REAL-TIME DATA COMMUNICATION OVER INTERNET OF THINGS NETWORK," filed on Sep. 5, 2013, the benefit of priority of which is claimed hereby, and which is incorporated by reference herein in its entirety.

TECHNICAL FIELD

The present subject matter relates, in general, to data communication and, in particular, to data communication over Internet of Things network.

BACKGROUND

Internet of Things (IoT) is an emerging technology, linking different communication devices, including sensors and actuators, such as Radio Frequency Identifications (RFID), Global Positioning Systems (GPS), and laser scanners, through wired and wireless networks, often using the same Internet Protocol (IP) that connects the Internet, to form a communication network such as IoT network.

Typically, the IoT is used for the various purposes of 'information collection and analysis', for example, monitoring behavior of persons, things, and/or data through space and time, achieving real-time awareness of physical environment, assisting human decision making through deep analysis and data visualization, gathering information in diverse settings including natural ecosystems, buildings, and factories and sending the information to one or more server stations, for 'automation and control', for example, automated control of closed (self-contained systems), control of consumption to optimize resource use across network, automated control in open environment with uncertainty.

The emergence of the IoT network is promoted by wide-ranging applications, including security surveillance, medical, environment and weather monitoring, monitoring and control of industrial processes including agriculture, smart spaces, and smart cities among others.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the drawings to reference like features and components.

Figure 1:
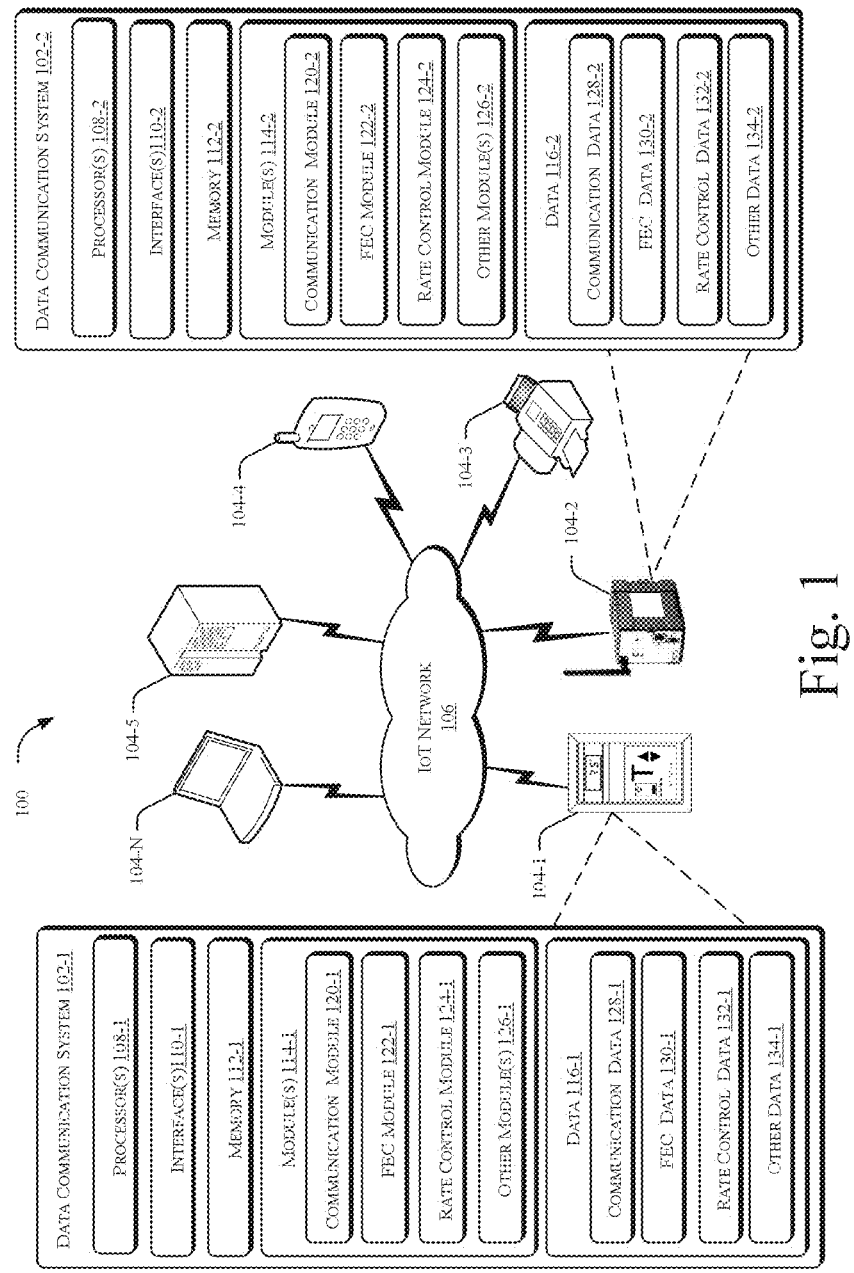
FIG. 1 illustrates a communication environment implementing a data communication system for real-time data communication over an Internet of Things (IoT) network, in accordance with an embodiment of the present subject matter.
Figure 2A:
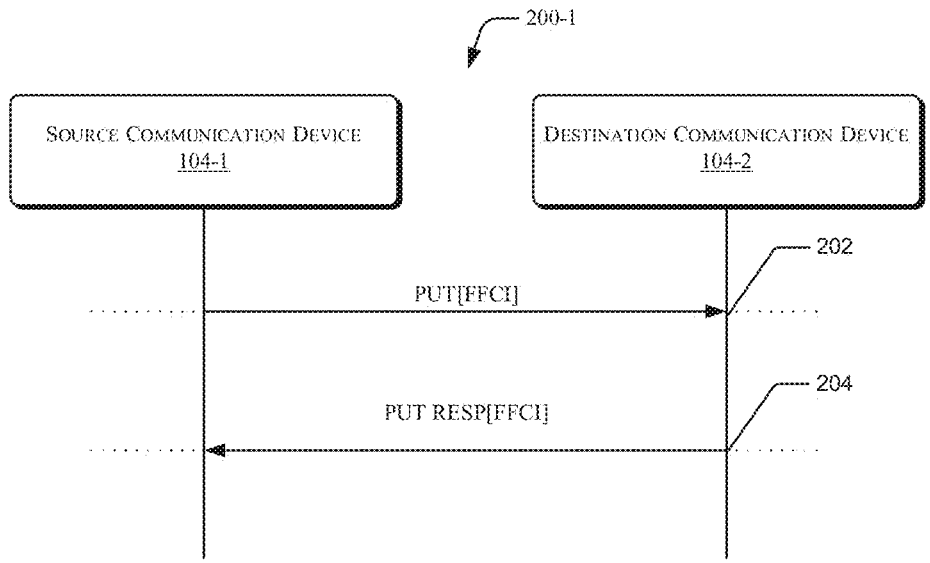
FIG. 2(a) illustrates a call flow diagram for establishment of Forward Error Correction (FEC) context, in accordance with an implementation of the present subject matter.
Figure 2B:
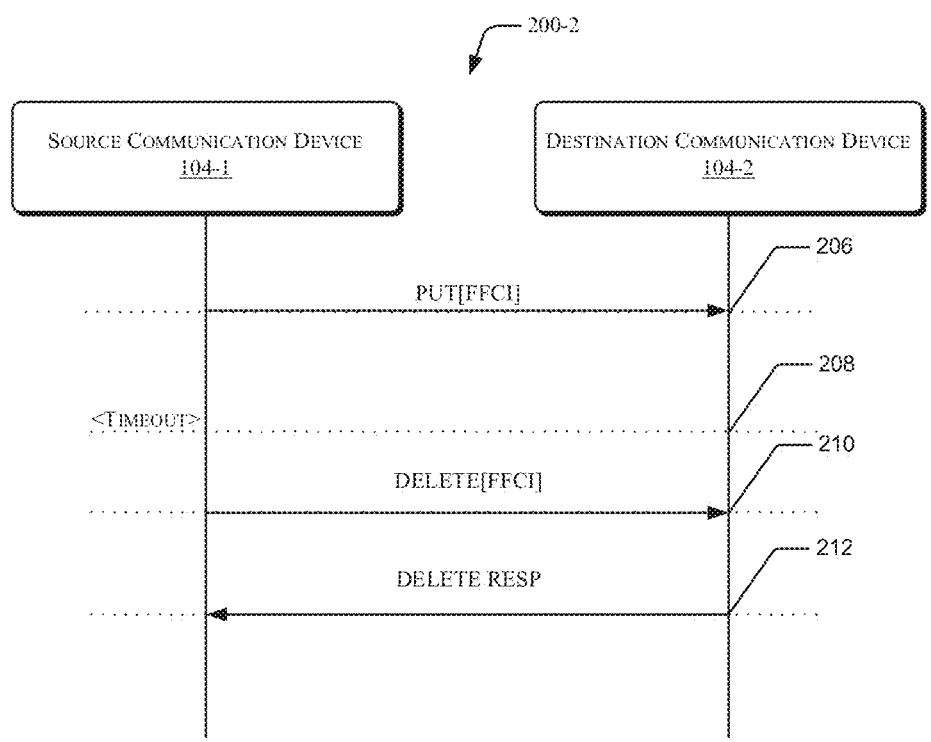
FIG. 2(b) illustrates a call flow diagram for timeout handling, in accordance with an implementation of the present subject matter.
Figure 2C:
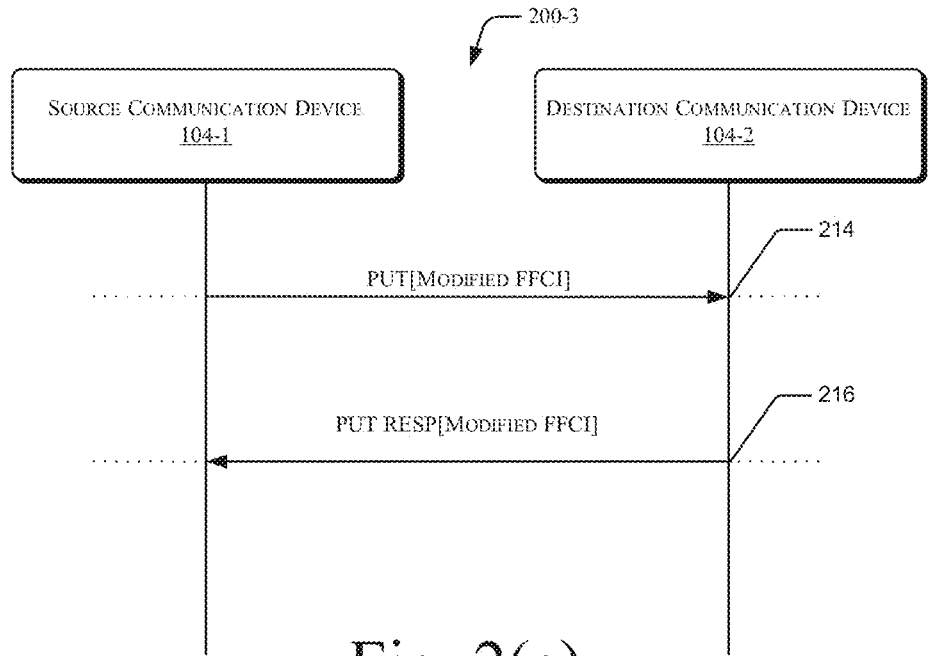
FIG. 2(c) illustrates a call flow diagram for modification of FEC context, in accordance with an implementation of the present subject matter.
Figure 2D:
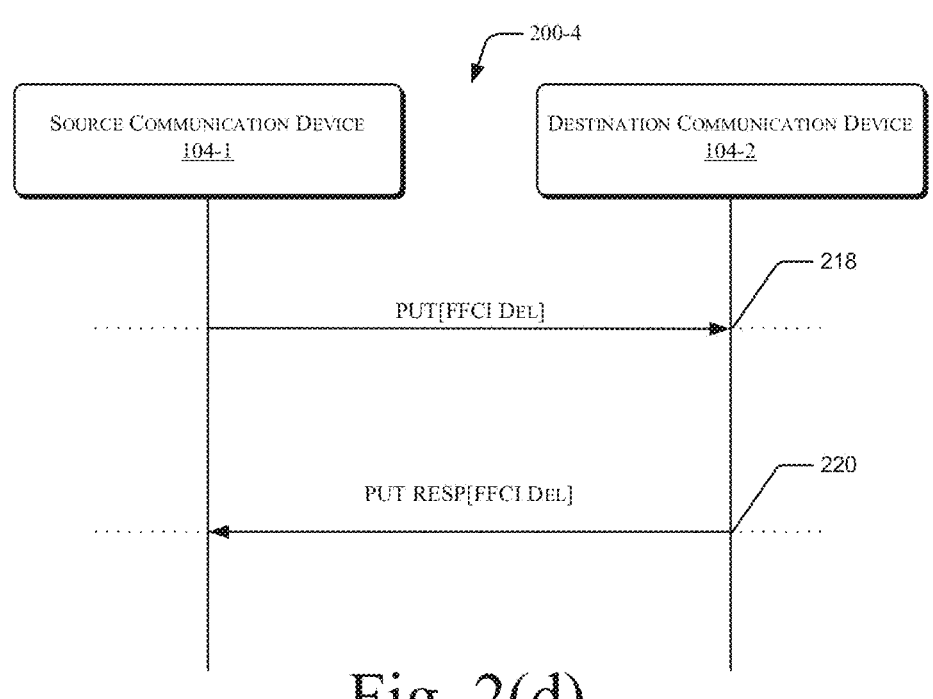
FIG. 2(d) illustrate a call flow diagram for deletion of FEC context, in accordance with an implementation of the present subject matter.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DETAILED DESCRIPTION

Systems and methods for real-time data communication over an Internet of Things (IoT) network are described herein. The IoT network may include existing and evolving communications networks, such as Wi-Fi, Bluetooth, Zig-Bee, General packet radio service (GPRS), Internet, and Radio Access Network (RAN). In other words, the IoT may be a heterogeneous network connecting millions of computing devices and objects to each other to exchange data. To facilitate exchange of data between the computing devices functioning on multiple protocols, such as Transmission Control Protocol/Internet Protocol (TCP/IP), User Datagram Protocol (UDP), Constrained Application Protocol (CoAP), Datagram Congestion Control Protocol (DCCP) are implemented in the communication networks.

The systems and the methods can be implemented in a variety of systems or devices. The systems or devices that can implement the described methods include, but are not limited to, sensors like accelerometer, gyroscope, audio sensor, temperature sensor, light sensor, etc., actuators, networked intelligence devices, desktop computers, mobile personal gadgets, building-automation devices, cellular phones, machine-to-machine (M2M) devices, hand-held devices, laptops or other portable computers, landline phones, and the like. Although the description herein is with reference to unicast message communication methodology, it would understood that the systems and methods can be implemented in other message delivery methods, such as anycast message addressing methodology, broadcast message addressing methodology, multicast message addressing methodology albeit with a few variations, as will be understood by a person skilled in the art.

Data communication is a physical transfer of data from one point to another using communication networks. Typically, different communication networks work on distinct communication protocols where the communication protocols define the rules and data formats for data transmission and data reception in the communication networks. Each communication protocol may be further explained as a set of procedures to be followed for data transmission and reception through the communication network. An Open Systems Interconnection (OSI) model defines a networking framework for implementing communication protocols in seven layers. The seven layers are application layer (layer 7), presentation layer (layer 6), session layer (layer 5), transport layer (layer 4), network layer (layer 3), data link layer (layer 2), and physical layer (layer 1).

During data communication through a communication network based on an OSI network model, at a source, data is passed from one layer to the next, starting at the application layer, and proceeding to the physical layer. The data is passed from one layer to another to utilize service of the layers below and finally, the data is transmitted. As would be appreciated, the transmission occurs from the source to the destination over communication channel of the communication network. Further, at the destination, data is passed from the physical layer and finally received by the application layer.

However, while data is communicated from the source to the destination, data corruption and data loss is a frequent occurrence and an unavoidable phenomenon in any communication network.

Probabilities of data corruption and data loss during communication have a variety of causes. Generally, interruption of data transmission and data reception, and communication network link failure causes data loss or data corruption. Further, environmental conditions can interfere with data communication, especially when dealing with wireless communication through Wi-Fi or GPRS. In the IoT network, since multiple combination of communication networks are involved, typically, network-layer level protocol conversion takes place during data transmission from one communication network to another. The probability of data loss is further increased in such IoT network due to data transfer between multiple communication networks and the conversions.

Conventional methods for reducing the probability of data loss and increasing reliability utilize error correction techniques. Error correction techniques may be explained as the method of detecting errors and reconstruction of the original, error-free data. However, the error correction techniques, though being practically applied, vary from one communication network to another. For example, a third generation (3G) communication network uses turbo codes for error correction and a fourth generation (4G) communication network uses concatenated codes for error correction. Further, the error correction technique differs in implemented layer of an OSI model network. For example, LAN network provides the error correction at physical layer whereas internet protocol provides it at the transport layer. The difference in application and types of conventional error correction techniques acts as a limitation during data transmission over IoT network. Also, since in an IoT network the data transmission may occur between different communication networks; error correction techniques employed by one communication network may not be detected by another communication network. Hence, the conventional error correction techniques of the communication network do not provide the facility to utilize the error corrected data for reliable and real-time data transmission over IoT network.

Furthermore, conventional error correction technique implementations have limited capability of error correction due to inability to handle erasures. An example of conventional error correction technique is a transmission control protocol for internet protocol (TCP/IP), which detects error developed during transmission but provides no error correction facility. End-to-end error control techniques such as automatic repeat request (ARQ) may be used, by retransmitting dropped data packets upon the destination's request. However, because of retransmissions, ARQ is not appropriate for various applications of IoT, such as safety-critical applications, and urgent messaging which may have time constraints.

Also, the data communicated in IoT network may suffer from losses due to network congestion caused by the limited capacity of queue in the IoT entities. The data communicated over IoT network is typically communicated with User Datagram Protocol (UDP) over the transport layer. Local queues at the source may overflow, leading to source data packet drop. At the destination, loss of data packets may happen due to reasons, such as insufficient time of data receiving, overflow of local queues at the destination. If the data receiving time is increased beyond a point the criticality of time to receive time sensitive data is compromised. However dynamically estimated value of Round Trip Time (RTT) as time delay for UDP data traffic, can be utilized for reliable data packet reception success ratio for low data volume applications. The RTT approach may be utilized in situations where there is a 'seek acknowledgment' message sent from the destination for the source data packets. Seeking acknowledgment message, or having round trip delay for the data communication over IoT network may be undesirable due to the nature of data communication between IoT entities which may include safety-critical applications and applications which are under time constraint.

The present subject matter describes systems and methods for real-time data communication over an IoT network. The described methods and systems may be implemented in IoT entities distributed over the IoT. The systems and the methods, implemented in the IoT entities, enable real-time data communication over the IoT network. Further, the systems and the methods facilitate the destination to repair data losses without requiring packet retransmission. Furthermore, the systems and the methods enable end-to-end rate control so that the data packet loss is minimal.

In an implementation of the present subject matter, real-time data communication over an IoT network is performed by implementing Forward Error Correction (FEC). In order to implement FEC for data communication, the IoT entities, i.e., source and destination, exchange information corresponding to a FEC framework configuration and establish a FEC context corresponding to a FEC configuration associated with the source and the destination to be utilized for data encryption and decryption.

In an implementation of the present subject matter, the source encodes the data to be exchanged with peer sub-layers of the destination, based on the established FEC context. In said implementation, the peer sub-layers are implemented over session layers of a seven layer OSI model network of the IoT entities. The implemented peer sub-layers conceptually form part of application layer. The implementation of the encoding of data with FEC context at the application layer of the source enables the maintenance of integrity of data to be exchanged between the peer sub-layers of the source and the destination, where data corruption and data loss may occur due to transmission and conversion of data. During the encoding of the data, the source may include redundant data based on the established FEC context. The source may transmit the encoded data as data packets to the destination. The redundant data may be obtained such that data losses, if any, may be repaired by utilizing the redundant data included in the transmitted encoded data. The implementation of the FEC approach facilitates the reconstruction of the lost data at the destination without having to require retransmission of the data from the source.

The described systems and methods may also implement end-to-end rate control. At the source, the transmission of data packets may be based on a data rate control mechanism. To this end, the source may identify time delay to be maintained for transmission of data packets from the source to the destination to have reliable data transmission from the source. The identification of the time delay may be based on average bandwidth offered by IoT network. Performance of communication through IoT network may be considered to be quasi-static over time intervals applicable for the data packet transmission. The time delay may be such that the data packets of certain sizes are transmitted from the source node to match the quasi-static average bandwidth offered by the IoT network. The source may transmit the data packets based on the identified time delay.

In an implementation of the present subject matter, one or more data packets comprising encoded data from the source may be received at the destination over the IoT network. At destination, the received data packets may be decoded at the peer sub-layer based on the established FEC context to obtain data exchanged between the source and the destination, where the peer sub-layer is implemented as part of application layer of a seven layer OSI model network of the destination. The implementation of the FEC approach to recover the lost data, if any, provides reliable transmission of data from source to destination in reduced time.

According to an implementation of the present subject matter, a rate control mechanism may be implemented at the destination to facilitate eventual reception of all/most of the data packets transmitted from the source to destination. The rate control mechanism may be implemented based on determining a reception time interval for receiving all data packets from the time of reception of a first data packet at the peer sub-layer of the destination. The determining of the reception time interval may be based on average bandwidth offered by the IoT network. The determining of the reception time interval may further be based on a total number of data packets to be received from the source and time taken by the first data packet to arrive at the destination. The decoding of the data packets may be performed after the expiry of the reception time interval.

The manner in which the systems and methods for real-time data communication over an IoT network based on FEC and end-to-end rate control shall be implemented has been explained in details with respect to the FIGS. 1 to 5. While aspects of the described systems and methods for FEC and end-to-end rate control can be implemented in any number of different computing systems, communication environments, and/or configurations, the embodiments are described in context of the following exemplary system(s).

It will also be appreciated by those skilled in the art that the words during, while, and when as used herein are not exact terms that mean an action takes place instantly upon initiating an action but that there may be some small but reasonable delay, such as a propagation delay, between the initial action, and the reaction that is initiated by the initial action. Additionally, the word "connected" and "coupled" is used throughout for clarity of the description and can include either a direct connection or an indirect connection.

FIG. 1 illustrates a communication environment implementing data communication systems 102-1 and 102-2, for real-time data communication over an IoT network 106. For the sake of explanation, the data communication systems 102-1 and 102-2 are individually referred to as the data communication system 102 and collectively referred to as data communication systems 102 hereinafter. In one implementation the data communication system 102 is connected to one or more communication devices 104-1, 104-2, 104-3, 104-4, 104-5 . . . 104-N, individually referred to as communication device 104 and collectively referred to as communication devices 104 hereinafter, through an IoT network 106. It will be appreciated by person skilled in the art that each communication device 104 may have a data communication system, such as the data communication system 102.

The data communication systems 102 can be implemented within a variety of communication devices 104, such as sensors, actuators, networked intelligence devices, desktop computers, mobile personal gadgets, building-automation devices, cellular phones, tablet computers, Machine-to-Machine (M2M) devices, hand-held devices, laptops or other portable computers, landline phones, workstations, mainframe computers, servers, and the like. The data communication system 102 described herein, can also be implemented in any network environment comprising a variety of network devices, including routers, bridges, servers, computing devices, storage devices, etc. The data communication system 102 may be located within the communication devices 104 or may be located outside the communication devices 104 at different geographic locations as compared to that of the communication devices 104. Further, the communication devices 104 may themselves be located either within the vicinity of each other, or may be located at different geographic locations.

The IoT network 106 may be a wireless or a wired network, or a combination thereof. The IoT network 106 can be a collection of individual networks, interconnected with each other and functioning as a single large network (e.g., the internet). Examples of such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), Wi-Fi, Bluetooth, ZigBee, GPRS, Internet, and RAN and Integrated Services Digital Network (ISDN). Depending on the technology, the IoT network 106 may include various network entities, such as gateways, routers; however, such details have been omitted for ease of understanding.

In one implementation, the data communication systems 102 includes a processor(s) 108-1 and 108-2, individually referred to as processor(s) 108 and collectively referred to as processors 108 hereinafter. The processor(s) 108 may be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in a memory.

Also, the data communication systems 102 includes interface(s) 110-1 and 110-2 individually referred to as interface 110 and collectively referred to as interfaces 110 hereinafter. The interface(s) 110 may include a variety of software and hardware interfaces that allow the data communication system 102 to interact with the entities of the IoT network 106, or with each other. The interface(s) 110 may facilitate multiple communications within a wide variety of networks and protocol types, such as IoT network 106, including wire networks, for example, LAN, cable, etc., and wireless networks, for example, WLAN, cellular, satellite-based network, etc.

The data communication systems 102 may also include memory 112-1 and 112-2, individually referred to as memory 112 and collectively referred to as memory 112 hereinafter. The memory 112 may be coupled to the processor 108. The memory 112 can include any computer-readable medium known in the art including, for example, volatile memory, such as static random access memory (SRAM), and dynamic random access memory (DRAM), and/or non-volatile memory, such as read only memory (ROM), erasable programmable ROM, flash memories, hard disks, optical disks, and magnetic tapes.

Further, the data communication systems 102 may include module(s) 114-1 and 114-2, individually referred to as module 114 and collectively referred to as modules 114 hereinafter. The data communication system may further include data 116-1 and 116-2, individually referred to as data 116 and collectively referred to as data 116 hereinafter. The module(s) 114 may be coupled to the processors 108 and amongst other things, include routines, programs, objects, components, data structures, etc., which perform particular tasks or implement particular abstract data types. The module(s) 114 may also be implemented as, signal processor(s), state machine(s), logic circuitries, and/or any other device or component that manipulate signals based on operational instructions.

In an implementation, the module(s) 114 include communication modules 120-1 and 120-2, FEC modules 122-1 and 122-2, rate control modules 124-1 and 124-2, and other module(s) 126-1 and 126-2. The other module(s) 126 may include programs or coded instructions that supplement applications or functions performed by the data communication system 102. In said implementation, the data 116 includes communication data 128-1 and 128-2, FEC data 130-1 and 130-2, rate control data 132-1 and 132-2, and other data 134-1 and 134-2. The other data 134, amongst other things, may serve as a repository for storing data that is processed, received, or generated as a result of the execution of one or more modules in the module(s) 114. Although the data 116 is shown internal to the data communication system 102, it may be understood that the data 116 can reside in an external repository (not shown in the figure), which may be coupled to the data communication system 102 or a part of the communication devices 104. The data communication system 102 may communicate with the external repository through the interface(s) 110 to obtain information from the data 116.

In accordance with an implementation of the present subject matter, real-time data communication between communication devices 104 implementing data communication systems 102 is described. It will be appreciated that although the description is provided in terms of the communication device 104-1 and the communication device 104-2, communicating with each other, the real-time data communication can be extended to other communication devices 104 as well. In said implementation, the communication device 104-1 may act as a source communication device 104-1 and the communication device 104-2 may act as a destination communication device 104-2.

In said implementation, for the purpose of data communication, the communication module 120-1 and the communication module 120-2 corresponding to the source communication device 104-1 and the destination communication device 104-2 respectively, exchange FEC framework configuration information (FFCI) message comprising information corresponding to a FEC configuration. The FEC configuration may include, amongst other information, encoding/decoding techniques, code types, and code parameters to carry out error correction mechanism at the source communication device 104-1 and the destination communication device 104-2. The exchange of the FFCI message may be between the peer sub-layers of the source communication device 104-1 and the peer sub-layers of the destination communication device 104-2. In one implementation, the peer sub-layers are implemented over session layers, which may form parts of application layers of a seven layer OSI model network. Based on the exchanged FFCI message the FEC module 122-1 and the FEC module 122-2 may agree to implement the information in the exchanged FFCI message and establish a FEC context at the source communication device 104-1 and the destination communication device 104-2 respectively. The FFCI message may be exchanged via an acknowledged message transfer to establish the FEC context. The acknowledged message transfer or confirmable messaging may be used by the source communication device 104-1 and the destination communication device 104-2 to be aware that an FEC context has been established. When the source communication device 104-1 and the destination communication device 104-2 are aware that the FEC context has been established, extraneous encoding or decoding may be prevented and data received at the destination communication device 104-2 may be decoded. The established FEC context may be stored at the FEC data 130-1 and the FEC data 130-2, at the source communication device 104-1 and the destination communication device 104-2, respectively. Once the FEC context is established, the source communication device 104-1 and the destination communication device 104-2 may communicate data implementing FEC mechanism based on the established FEC context.

Typically while communicating data through IoT network 106, the data at the communication devices 104 passes through various layers of the seven layer OSI model network during data transmission and data receiving. At the source communication device 104-1, data first passes through the application layer and then session layer till the physical layer. In such a flow of data, the source data is encapsulated with the corresponding layer communication protocol data, where encapsulation signifies packing of data. The packing, for example, may be considered as an action of a letter being put in an envelope, where letter signifies the previous layer data, the envelope signifies the corresponding layer communication protocol data and the action signifies the encapsulation.

Further, at the destination communication device 104-2, the received data passes through different layer in the opposite order as compared to the source communication device 104-1, i.e., first physical layer and then up the order till application layer. At the receiving end, the encapsulated data is decapsulated in the opposite order, where decapsulation signifies unpacking of data. In the said example of letter encapsulated in an envelope, the action of removing the letter from the envelope can be considered as decapsulation. In a seven layer OSI model network the data encapsulated and decapsulated between the application layer and the presentation layer of the source communication device 104-1 is generally know as an application layer data.

In the IoT network 106, during data transmission between different communication networks, at interconnecting gateways, a network-layer level protocol conversion may take place. The transmitted data may undergo conversion when it is transmitted during a unicast session extending from one communication network to another communication network, forming part of the IoT network 106. The conversion is based on communication protocols used in either of the communication networks. However, the application layer data that is carried by the communication network, does not undergo any conversion and is tunneled across the communication networks boundaries. The FEC is implemented on application layer data to enable reliable and real-time data transmission over the IoT network 106, where data corruption and data loss may occur due to transmission and conversion of the data. The FEC context may include usage of existing block codes, such as Reed-Solomon (RS) codes.

The FEC module 122-1 implemented at the source communication device 104-1 may encode the data to be exchanged between the peer sub-layers of the source communication device 104-1 and the destination communication device 104-2 based on the established FEC context. The FEC module 122-1 performs the FEC technique on application layer data at the source communication device 104-1 to enable real-time and reliable data communication over the IoT network 106. The FEC technique is addition of systematically generated redundant data to data to be communicated, to obtain the encoded data, where the redundant data is systematically generated such that the redundant data allows detection and correction of a limited number of errors which may occur during communication of the data. In the FEC technique, the source communication device 104-1 encodes the data in a redundant way, by using an Error-Correcting Code (ECC). The redundancy included in the encoded data allows the destination communication device 104-2 to detect a limited number of errors that may occur in the data transmitted, and facilitate to correct these errors, without need for retransmission of the data. The encoded data may be stored in the communication data 128-1 for transmission.

The data to be transmitted may be segmented at the application layer, by the FEC module 122-1 of the source communication device 104-1 to form data packets, for encoding and/or transmission purposes. The FEC module 122-1 implemented within the application layer may control the reliability of the real-time data communication though segmentation/desegmentation and ECC.

For example, the data to be transmitted is segmented in a group of k data packets. The FEC technique is applied to the group of k data packets to obtain encoded data packets. The k data packets may be encoded based on the FEC context to yield a new group of n (n>k) data packets. In the new group of n data packets, k data packets are the original data packets while the remaining (n−k) packets provide data redundancy. The destination communication device 104-2 may decode and recover the data from k packets successfully received at the destination communication device 104-2.

In IoT network 106, the data to be exchanged between the communication devices 104 is typically bursty in nature. According to an implementation of the present subject matter, the data communication systems 102 may implement end-to-end rate control mechanism so to have minimal data packet drop. For this purpose, at the source communication device 104-1 the transmission of encoded data packets may be based on a rate control mechanism. The rate control module 124-1 of the source communication device 104-1 may identify time delay to be maintained between consecutive transmissions of bursts of encoded data packets from the source communication device 104-1 to the destination communication device 104-2. The identification is such that there is minimal data packet drop due to queue overflow at the source communication device 104-1.

In one implementation of the present subject matter, the identification of the time delay by the rate control module 124-1 is based on average bandwidth offered by the IoT network 106. Performance of communication through IoT network 106 may be considered to be quasi-static over time intervals applicable for the encoded data packet transmission. The rate control module 124-1 may identify the time delay to be such that the encoded data packets of certain sizes may be transmitted from the source communication device 104-1 to match the quasi-static average bandwidth offered by the IoT network 106. The source communication device 104-1 may transmit the bursts of data packets based on the identified time delay.

In an implementation the rate control module 124-1 obtains the time delay '$T_{inter-burst}$' from the following equation.

$$T_{inter-burst} = \min\left\{\frac{b*8*n}{BW*1000}, RTT\right\} \quad (1)$$

where, b denotes number of bytes in an encoded data packet, n denotes number of encoded data packets in a burst and BW denotes Bandwidth of IoT and RTT denotes round trip time. In an implementation, the RTT may be obtained by the rate control module 124-1 from a traceroute utility.

The identified time delay may be stored in the rate control data 132-1. Based on the identified time delay, the communication module 120-1 may transmit the encoded data packets which may be stored in the communication data 132-1. The encoded data packets may transverse through the lower layers of the seven layer OSI model network as described and through the IoT network 106 and reach the destination communication device 104-2.

In accordance with an implementation of the present subject matter, the communication module 120-2 of the destination communication device 104-2 may receive the encoded data packets transmitted from the source communication device 104-1. The communication module 120-2 may store the received encoded data in communication data 128-2.

In said implementation, the data communication system 102-2 of the destination communication device 104-2 implements a timer management mechanism so to have minimal encoded data packet drop. The rate control module 124-2 implemented at the destination communication device 104-2 may determine a reception time interval. The reception time interval may be determined so to obtain time to receive most/all of encoded data packets. The reception time interval may be obtained from the time of reception of a first encoded data packet at the destination communication device 104-2. In an implementation, the rate control module 124-2 may determine the reception time interval '$R_{timeout}$' based on total number of encoded data packets to be received, average bandwidth offered by the IoT network 106 and time taken by the first data packet to arrive at the destination communication device 104-2 as follows $$R_{timeout} = \left\{\frac{N}{n}\right\} * T_{inter-burst} + (1+\delta)*t_{FCCI} \quad (2)$$

where, N is total number of encoded data packets that will be transmitted by the source communication device 104-1 to the destination communication device 104-2, n is the number of encoded data packets in each burst, $T_{inter-burst}$ is the time delay calculated at the source communication device 104-1, $t_{FFCI}$ is the time taken by the FFCI message to arrive at the destination communication device 104-2, and δ is variation in latency, generally measured as an approximation to communication network jitter, such as jitter in the IoT network 106.

The rate control module 124-2 may wait till the expiry of the determined reception time interval from the time of reception of the first encoded data packet at the destination communication device 104-2. Once the reception time interval expires the rate control module 124-2 may notify the FEC module 122-2.

Upon reception of the notification based on the expiry of the reception time interval from the rate control module 124-2, the FEC module 122-2 may decode the received encoded data packets at the application layer to obtain data exchanged between the peer sub-layers of the source communication device 104-1 and the destination communication device 104-2. The decoding of the received encoded data packets is based on the established FEC context.

It will be appreciated by person skilled in the art that there may be numerous operations such as encapsulation and decapsulation at the lower layers of the seven layer OSI model network to facilitate the real-time data communication between the source communication device 104-1 and the destination communication device 104-2, the details of which have been omitted for sake of brevity of the description.

In an example, consider a situation where the data communication systems 102 according to the present subject matter are implemented in communication devices 104 in a house security system. The communication devices 104 include, a motion detector 104-1, a smartphone 104-2, a door lock sensor 104-3, a smoke and heat sensor 104-4, and a security camera 104-5. The motion detector 104-1 may detect any motion within the house and communicate information with the smartphone 104-2. In such a scenario, the motion detector 104-1, the smartphone 104-2, the door lock sensor 104-3, the smoke and heat sensor 104-4, and the security camera 104-5 individually may be using a different communication network to connect to other communication devices 104. In an emergency situation, the data from the communication devices 104, such as smoke and heat sensor 104-4 is critical as well as urgent and delay in receiving or drop or loss of this data may result in serious consequences.

In said example, the heat sensor 104-4 and the smartphone 104-2 may implement a CoAP as session layer to communicate over the IoT network 106. The heat sensor 104-4 and the smartphone 104-2 may exchange the FFCI message between peer sub-layers implemented as parts of application layers, via an acknowledged message transfer, as will be described in detail with respect to explanation of forthcoming figures. The heat sensor 104-4 and the smartphone 104-2 may establish a FEC context based on the FFCI message. In said example, the FEC context may be based on error correction codes, such as the RS codes. The encoding/decoding and the communication between the heat sensor 104-4 and the smartphone 104-2 will be based on the established FEC context.

In situation of fire, the heat sensor 104-4 may encode the data to be communicated with the smartphone 104-2 based on the established FEC context, to obtain encoded data packets. The data to be communicated may contain information related to the detection of fire and other related details. The heat sensor 104-4 may obtain the time delay from equation (1). Based on the time delay obtained the heat sensor 104-4 may transmit the encoded data packets to the smartphone 104-2, such that there is no data packet drop at the heat sensor 104-4. The smartphone 104-2 may receive the encoded data packets from the heat sensor 104-4. The smartphone 104-2 may determine the reception time interval from equation (2). Upon expiry of the reception time interval from the time of reception of the first encoded data packet at the smartphone 104-2, the smartphone 104-2 may decode the received encoded data packets based on the established FEC context.

FIG. 2(*a*), FIG. 2(*b*), FIG. 2(*c*), and FIG. 2(*d*) illustrate call-flow diagrams 200-1, 200-2, 200-3, and 200-4, respectively, for real-time data communication over the IoT network 106, in accordance with implementations of the present subject matter. The various arrow indicators used in the call-flow diagrams depict the transfer of information between the communication devices 104. In many cases, multiple network entities besides those shown may lie between the entities, including transmitting devices, and switching devices, although those have been omitted for clarity. Similarly, various acknowledgement and confirmation network responses may also be omitted for clarity.

The call flow to facilitate real-time data communication over the IoT network 106 have been explained in reference to the data communication system 102-1 associated with the communication device 104-1 and the data communication system 102-2 associated with the communication device 104-2, in the call-flow diagrams 200-1, 200-2, 200-3, and 200-4.

Referring to the call-flow diagram 200-1 depicted in FIG. 2(*a*), at step 202 a message is transmitted from the source communication device 104-1 to the destination communication device 104-2. For the purpose of establishment of FEC context, there is an exchange of FFCI message between the communication device 104-1 and the destination communication device 104-2. The exchange of the FFCI message may be between peer sub-layers implemented as parts of application layers, via an acknowledged message transfer, where the FFCI message comprises information corresponding to FEC configuration to establish FEC context at the source communication device 104-1 and the destination communication device 104-2. As depicted, according to a specific implementation of the present subject matter, the FFCI message may be encapsulated in a Protocol Data Unit (PDU) of the CoAP and transmitted from the source communication device 104-1. The FFCI message may be generated by the FEC module 122-1 of the source communication device 104-1, based on FEC techniques supported by the FEC module 122-1. The FFCI message may be transmitted by the communication module 120-1 of the source communication device 104-1 and received at the communication module 120-2 of the destination communication device 104-2.

In a specific implementation of the present subject matter, the FFCI message may have the following elements as depicted in table 1.

TABLE 1

| FFCI Parameter | Description |
| --- | --- |
| K | Original number of data packets |
| N | Number of packets after RS Encoding |
| Sz | Size of each RS-Encoded data packet |
| Padding | Extraneous bytes in the last data packet |
| Time Delay | Inter-Burst delay in milliseconds |
| currentTimeMillis( ) | Time at which FFCI message was sent |

Based on the FFCI message received by the communication module 120-2, the FEC module 122-2 of the destination communication device 104-2 may verify if the FEC context proposed by the FFCI message is feasible to be implemented at the destination communication device 104-2. For example in some situations, the destination communication device 104-2 may not support the FEC context proposed by the FFCI message and hence may not be feasible to be implemented at the destination communication device 104-2. If the FEC context proposed by the FFCI message is found to be feasible to be implemented, the FEC module 120-2 establishes the FEC context and notifies the communication module 120-2 to transmit a response regarding creation of the FEC context to the source communication device 104-1. If the FEC context proposed by the FFCI message is found to be not supported/feasible, the FEC module 122-2 may notify the communication module 120-2 to communicate non establishment of the FEC context, with the source communication device 104-1.

Upon reception of notification from the FEC module 122-2, the communication module 120-2 may transmit response to the source communication device 104-1, which may be received at the communication module 120-1, as depicted at step 204. In a specific implementation of the present subject matter with CoAP being a session layer, the communication module 120-2 may transmit a PUT response 2.01 (Created) corresponding to establishment of the FEC context and PUT response 5.01 (Not Implemented) corresponding to non-establishment of the FEC context at the destination communication device 104-2.

In situation, the response received at the communication module 120-1 is regarding the establishment of the FEC context at the destination communication device 104-2, the FEC module 122-1 may implement the FEC context for further communication of data with the destination communication device 104-2. In case the response received is regarding the non-establishment of the FEC context, the source communication device 104-1 may propose alternate FEC context through a new FFCI message.

Referring to the call-flow diagram 200-2, at step 206 the source communication device 104-1 may transmit FFCI message to the destination communication device 104-2. Since establishment of the FEC context is via usage of Confirmable messaging, it is possible that the source communication device 104-1 may not receive a response from the destination communication device 104-2 within a predetermined time leading to timeout, at step 208. It is also possible that an empty response is received, and application-specific timeout happens during which a final PUT response is not received at the source communication device 104-1.

In case of a timeout, the source communication device 104-1 initiates a deletion of the FEC context, if any, at the destination communication device 104-2. At step 210, the source sends a DELETE request to its peer via another Confirmable message. The destination communication device 104-2 may receive the DELETE request from the source communication device 104-1 and the FEC module 122-2 may delete FEC context, if any had been created. Upon transmission of the DELETE request, the source communication device 104-1 may ignore any response from the destination communication device 104-2 corresponding to the FFCI message from the source communication device 104-1, as the source communication device 104-1 has initiated deletion of the FEC context.

At step 212, the destination communication device 104-2 sends a delete confirmation response to the source communication device 104-1 indicating the FEC context, if any, had been deleted at the destination communication device 104-2. The delete confirmation response may be sent by the communication module 120-2.

Referring to the call-flow diagram 200-3, modification of the FEC context is described. At step 214, the source communication device 104-1 sends a modified FFCI message to the destination communication device 104-2. The approach for sending the modified FFCI message is similar to as described with respect to step 202 of the call flow diagram 200-1. The destination communication device 104-2 may establish the FEC context proposed from the modified FFCI message based on the verification. The FEC context proposed by the modified FFCI message is found to be feasible to be implemented, the FEC module 120-2 modifies the FEC context to proposed FEC context and notifies the communication module 120-2 to transmit a response regarding modification of the FEC context to the source communication device 104-1. If the FEC context proposed by the modified FFCI message is found to be not supported/feasible, the FEC module 120-2 may notify the communication module 120-2 to communicate non modification of the FEC context, with the source communication device 104-1.

At step 216, as shown in a specific implementation of the present subject matter with CoAP being as a session layer, the communication module 120-2 may transmit a PUT response 2.04 (Changed) for modification of the FEC context and PUT response 5.01 (Not Implemented) for non-modification of the FEC context at the destination communication device 104-2. In situation where the PUT response 5.01 is received at the source communication device 104-1, earlier FEC context based on previous FFCI message is reestablished. The source communication device 104-1 will commence encoding and transmission of the data based on the FEC context proposed in modified FFCI message, after the reception of the PUT response 2.04 from the destination communication device 104-2.

Referring to the call-flow diagram 200-4, deletion of the FEC context is described. At step 218, the source communication device 104-1 sends a FFCI DELETE request to the destination communication device 104-2. The destination communication device 104-2 may receive the DELETE request from the source communication device 104-1 and the FEC module 122-2 delete existing FEC context at the destination communication device 104-2.

At step 220, the destination communication device 104-2 sends a delete confirmation response to the source communication device 104-1 indicating the FEC context has been deleted at the destination communication device 104-2. The delete confirmation response may be sent by the communication module 120-2.

Figure 3:
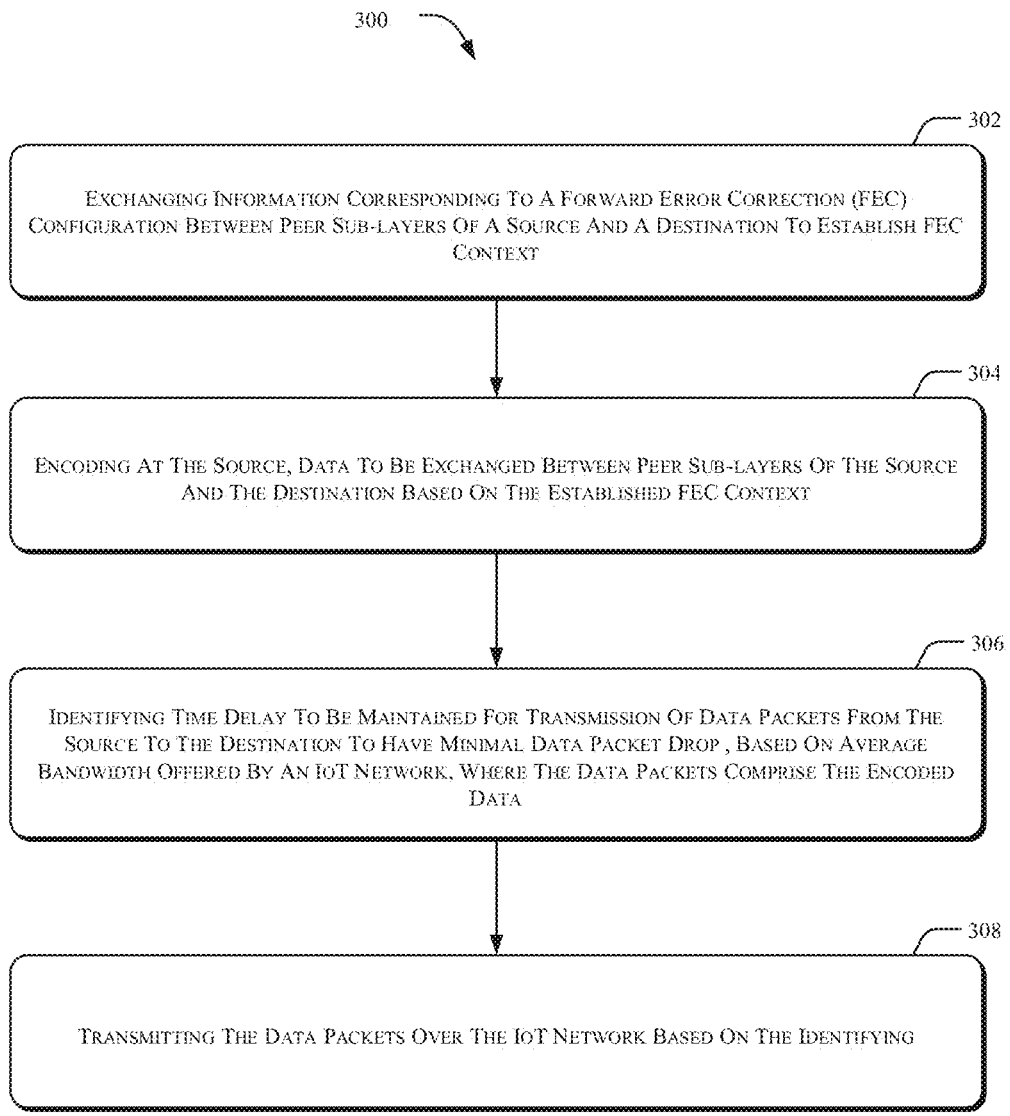
FIG. 3 illustrates a method for real-time data communication over IoT network, in accordance with an embodiment of the present subject matter.
Figure 4:
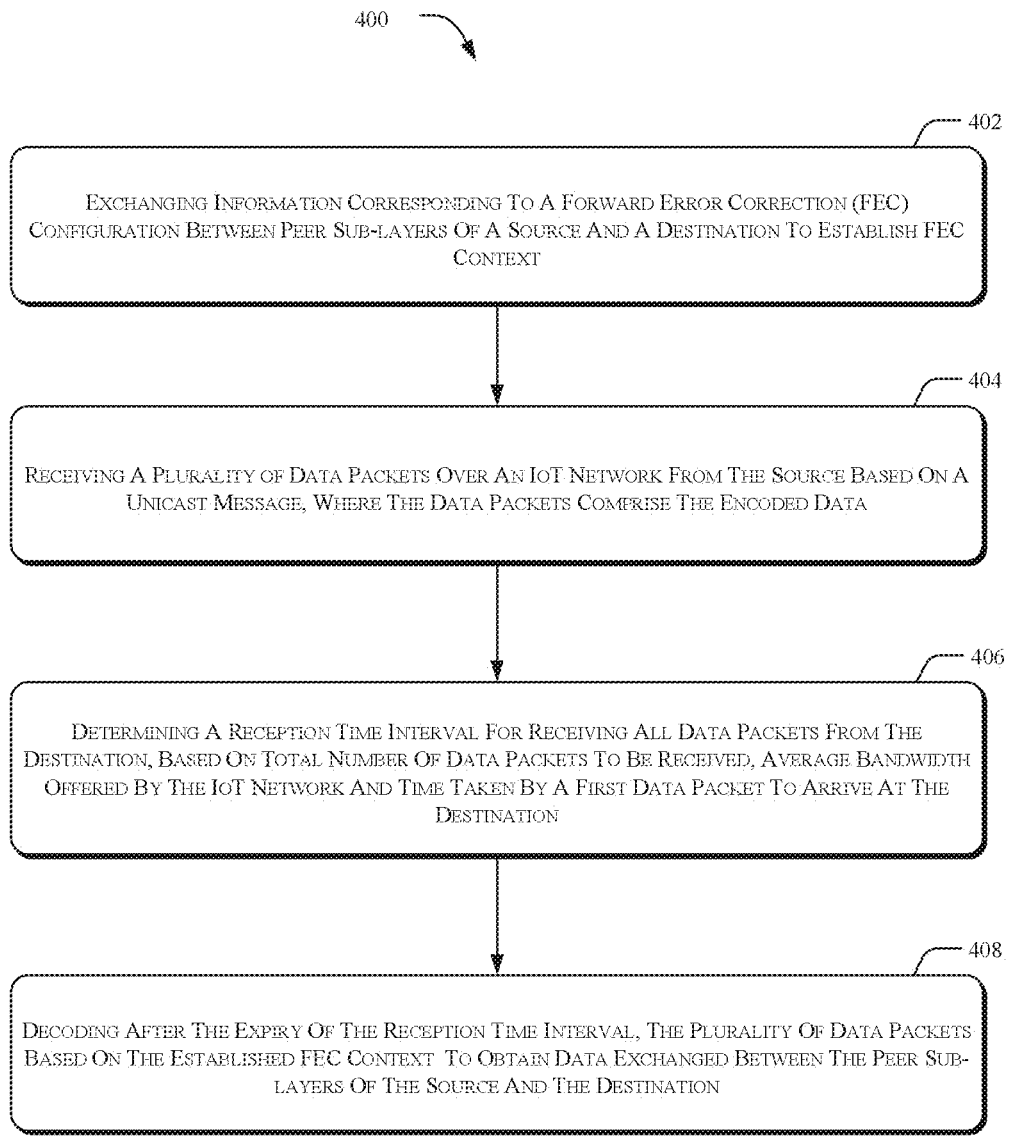
FIG. 4 illustrates a method for real-time data communication over IoT network, in accordance with an embodiment of the present subject matter.

FIG. 3 and FIG. 4 illustrate methods 300 and 400 respectively, for real-time data communication over an IoT network 106, according to an implementation of the present subject matter. The order in which the methods are described is not intended to be construed as a limitation, and any number of the described method blocks can be combined in any order to implement the methods 300 and 400 or any alternative methods. Additionally, individual blocks may be deleted from the methods without departing from the spirit and scope of the subject matter described herein.

The method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

Referring to FIG. 3, the method 300 may be implemented by IoT entities 104 acting as source communication device 104-1, distributed in the IoT network 106 for real-time data communication over the IoT network 106. At block 302, FFCI message is exchanged between peer sub-layers of IoT entities 104 via an acknowledged message transfer to establish FEC context. The IoT entities 104 may comprise a source communication device 104-1 and at least one destination communication device 104-2. The FFCI message may comprise information corresponding to the FEC configuration. In an implementation the peer sub-layers are implemented as a part of a CoAP. Based on the exchanged FFCI message the source communication device 104-1 and the destination communication device 104-2 may establish the FEC context. In an implementation, the FEC configuration is based on Reed-Solomon code. In an implementation, FFCI message between peer sub-layers of IoT entities via an acknowledged message transfer may be exchanged to modify the FEC context, where the FFCI message comprises information corresponding to a new FEC configuration.

At block 304, data to be exchanged between peer sub-layers of the source communication device 104-1 and the at least one destination communication device 104-2 is encoded based on the established FEC context. In an implementation the FEC context may be based on RS code.

At block 306, time delay to be maintained for transmission of encoded data packets from the source communication device 104-1 to the destination communication device 104-2 to have minimal data packet drop due to queue overflow at the source communication device 104-1 is identified. As described, the identification of the time delay may be based on average bandwidth offered by IoT network 106. At block 308, the source communication device 104-1 transmits the encoded data packets over the IoT network 106 based on the identified time delay.

Referring to FIG. 4, the method 400 may be implemented by the IoT entities 104 acting as destination communication device 104-2, distributed in the IoT network 106 for real-time data communication over the IoT network 106. At block 402, FFCI message is exchanged between peer sub-layers of IoT entities 104 via an acknowledged message transfer to establish FEC context. In an implementation, the peer-sub-layers are implemented as a part of CoAP. The IoT entities 104 may comprise a source communication device 104-1 and at least one destination communication device 104-2. The FFCI message may comprise information corresponding to the FEC configuration. Based on the exchanged FFCI message the source communication device 104-1 and the destination communication device 104-2 may establish the FEC context. In an implementation, the FEC configuration is based on Reed-Solomon code.

At block 404, the destination communication device 104-2 receives a plurality of encoded data packets, for example k encoded data packets, over the IoT network 106 from the source communication device 104-1. The encoded data packet may be transmitted based on a unicast message.

At block 406, a reception time interval for receiving all data packets from the time of reception of a first encoded data packet may be determined at the destination communication device 104-2. As described, the determining of the reception time interval may be based on total number of encoded data packets to be received, average bandwidth offered by the IoT network 106 and time taken by the first encoded data packet to arrive at the destination communication device 104-2.

At block 408, the plurality of encoded data packets is decoded at the destination communication device 104-2, based on the established FEC context, to obtain data exchanged between the peer sub-layers of the source communication device 104-1 and the destination communication device 104-2.

Although implementations for methods and systems for real-time data communication over the IoT network 106 have been described in a language specific to structural features and/or methods, it is to be understood that the present subject matter is not necessarily limited to the specific features or methods described. Rather, the specific features and methods are disclosed as implementations for real-time data communication over the IoT network 106.

We claim:

1. A method for real-time data communication over an Internet of Things (IoT) network at a source communication device, the method comprising:

establishing a Forward Error Correction (FEC) context by exchange of Forward error correction Framework Configuration Information (FFCI) message between a source communication device and at least one destination communication device;

transmitting a response regarding establishment of the FEC context to the source communication device and verifying feasibility of the established FEC context to be implemented at the at least one destination communication device;

encoding, at the source communication device, data to be exchanged between peer sub-layers of IoT entities based on the established FEC context to generate encoded data packets, the IoT entities comprising the source communication device and the at least one destination communication device, wherein the FEC context is based on FEC configuration associated with the source communication device and the at least one destination communication device, wherein the FEC configuration further comprises:

exchanging of a FEC Framework Configuration Information (FFCI) message between peer sub-layers of the IoT entities via an acknowledged message transfer to establish FEC context and the FFCI message comprises information corresponding to the FEC configuration, and exchanging of the FFCI message between peer sub-layers of the IoT entities via an acknowledged message transfer to modify the FEC context and the FFCI message comprises information corresponding to a new FEC configuration, on the exchange of encoded data between peer sub-layers implemented over IoT session layers of the source communication device and peer sub-layers implemented over IoT application layers of the destination communication device, and wherein one or more errors, generated during communication of the encoded data packets at the source communication device, are detected and corrected at the one destination communication device to refrain from retransmission of the encoded data packets from the source communication device;

identifying time delay to be maintained between consecutive transmissions of the encoded data packets from the source communication device to the at least one destination communication device, wherein the time delay is such that queue overflow at the source communication device causes minimal data packet drop, and wherein the identifying is based on average bandwidth offered by IoT network; and transmitting the encoded data packets over the IoT network based on the identified time delay.

2. The method as claimed in claim 1, wherein the FEC configuration is based on Reed-Solomon code.

3. The method as claimed in claim 1, encoding further comprises: embedding redundant data based on established FEC context, wherein the redundant data is utilized for reconstruction of data.

4. The method as claimed in claim 1, wherein non-receipt of response from the at least one destination communication device at the source communication device within a predetermined time leads to timeout.

5. The method as claimed in claim 4, wherein the source communication device, based on the non-receipt of the response, initiates a deletion of the FEC context at the at least one destination communication device.

6. A data communication system for real-time data communication over an Internet of Things (IoT) network at a destination communication device, the data communication system comprising:
   a processor configured by the instructions stored in a memory to:
   exchange a Forward error correction Framework Configuration Information (FFCI) message between peer sub-layers of IoT entities via an acknowledged message transfer, wherein IoT entities comprises the destination communication device and at least one source communication device,
   wherein the FFCI message comprises information corresponding to Forward Error Correction (FEC) Configuration to establish FEC context at the IoT entities and verify feasibility of the FEC context proposed by the FFCI for implementation at the destination communication device,
   wherein the acknowledged message transfer is used by the source communication device and the destination communication device to be aware of the FEC context to be established such that extraneous encoding or decoding is prevented and facilitates decoding data received at the destination communication device, and
   wherein exchanging of the FFCI message between peer sub-layers of the IoT entities via an acknowledged message transfer to modify the FEC context and the FFCI message comprises information corresponding to a new FEC configuration, on the exchange of encoded data between peer sub-layers implemented over IoT session layers of the source communication device and peer sub-layers implemented over IoT application layers of the destination communication device;
   receive a plurality of data packets over the IoT network from the source communication device based on a unicast message, wherein one or more errors are detected and corrected at the destination communication device to refrain from retransmission of the plurality of data packets received from the source communication device; and
   decode the plurality of data packets based on the established FEC context, to obtain data exchanged between the peer sub-layers of the source communication device and the destination communication device, wherein the FEC context corresponds to FEC configuration associated with the source communication device and the destination communication device.

7. The data communication system as claimed in claim 6, further comprising a rate control module coupled to the processor, to determine a reception time interval for receiving all data packets from the time of reception of a first data packet at the destination communication device, wherein the determining is based on total number of data packets to be received, average bandwidth offered by the IoT network and time taken by the first data packet to arrive at the destination communication device.

8. The data communication system as claimed in claim 6, wherein the FEC module decodes the data exchanged between the peer sub-layers of the IoT entities after the expiry of the reception time interval.

9. The data communication system as claimed in claim 6, wherein the FEC module decode the data based on a Reed-Solomon code.

10. The data communication system as claimed in claim 6, further comprises notifying the communication module to transmit a response regarding establishment and non-establishment of the FEC context to the source communication device based on the verification of the FEC context proposed by the FFCI message.

11. A non-transitory computer readable medium having a set of computer readable instructions that, when executed, cause a data communication system for real-time data communication over an Internet of Things (IoT) network at a destination communication device to:
   exchange Forward error correction Framework Configuration Information (FFCI) message between peer sub-layers of IoT entities via an acknowledged message transfer, wherein IoT entities comprises the destination communication device and at least one source communication device,
   wherein the FFCI message comprises information corresponding to Forward Error Correction (FEC) Configuration to establish FEC context proposed by the FFCI at the IoT entities and verify feasibility of the FEC context for implementation at the destination communication device,
   wherein the acknowledged message transfer is used by the source communication device and the destination communication device to be aware of the FEC context to be established such that extraneous encoding or decoding is prevented and facilitates decoding data received at the destination communication device, and
   wherein exchanging of the FFCI message between peer sub-layers of the IoT entities via an acknowledged message transfer to modify the FEC context and the FFCI message comprises information corresponding to a new FEC configuration, on the exchange of encoded data between peer sub-layers implemented over IoT session layers of the source communication device and peer sub-layers implemented over IoT application layers of the destination communication device;
   receive a plurality of data packets over the IoT network from the source communication device based on a unicast message, wherein one or more errors are detected and corrected at the destination communication device to refrain from retransmission of the plurality of data packets received from the source communication device; and
   decode the plurality of data packets based on the established FEC context, to obtain data exchanged between the peer sub-layers of the source communication device and the destination communication device, wherein the FEC context corresponds to FEC configuration associated with the source communication device and the destination communication device.

12. The non-transitory computer readable medium as claimed in claim 11, further comprising a rate control module coupled to the processor, to determine a reception time interval for receiving all data packets from the time of reception of a first data packet at the destination communication device, wherein the determining is based on total number of data packets to be received, average bandwidth offered by the IoT network and time taken by the first data packet to arrive at the destination communication device.

13. The non-transitory computer readable medium as claimed in claim 11, wherein the FEC module decodes the data exchanged between the peer sub-layers of the IoT entities after the expiry of the reception time interval.

14. The non-transitory computer readable medium as claimed in claim 11, further comprises notifying the communication module to transmit a response regarding establishment and non-establishment of the FEC context to the source communication device based on the verification of the FEC context proposed by the FFCI message.

* * * * *